(12) United States Patent
Sato et al.

(10) Patent No.: US 10,634,911 B2
(45) Date of Patent: Apr. 28, 2020

(54) MIRROR UNIT AND DISPLAY DEVICE

(71) Applicant: NIPPON SEIKI CO., LTD., Niigata (JP)

(72) Inventors: Genichiro Sato, Niigata (JP); Hiroyuki Furusawa, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 165 days.

(21) Appl. No.: 15/573,983

(22) PCT Filed: May 13, 2016

(86) PCT No.: PCT/JP2016/064320
§ 371 (c)(1),
(2) Date: Nov. 14, 2017

(87) PCT Pub. No.: WO2016/186034
PCT Pub. Date: Nov. 24, 2016

(65) Prior Publication Data
US 2018/0292650 A1 Oct. 11, 2018

(30) Foreign Application Priority Data
May 18, 2015 (JP) ................................. 2015-100703

(51) Int. Cl.
*G02B 7/182* (2006.01)
*G02B 27/01* (2006.01)
*B60K 35/00* (2006.01)

(52) U.S. Cl.
CPC .......... *G02B 27/0149* (2013.01); *B60K 35/00* (2013.01); *G02B 7/182* (2013.01);
(Continued)

(58) Field of Classification Search
CPC .... G02B 7/182; G02B 27/01; G02B 27/0101; G02B 27/0149; G02B 7/1821
(Continued)

(56) References Cited

U.S. PATENT DOCUMENTS 4,203,654 A * 5/1980 Ellis ..................... G02B 7/1827
359/224.1
4,494,830 A * 1/1985 Grainge ................. G02B 7/004
359/876
(Continued)

FOREIGN PATENT DOCUMENTS

JP 40128751 * 11/1989
JP 019268/1990 U 2/1990
(Continued)

OTHER PUBLICATIONS

Search Report issued in corresponding International Patent Application No. PCT/JP2016/064320, dated Jul. 19, 2016.

*Primary Examiner* — Ricky D Shafer
(74) *Attorney, Agent, or Firm* — McDermott Will & Emery LLP

(57) ABSTRACT

A mirror unit includes a concave mirror having a mirror surface reflecting light, and a holder holding the concave mirror. The concave mirror includes first to third positioning protruding portions. The holder includes: a first holder-side positioning portion defining, through contact with the first positioning protruding portion, the position of the concave mirror with respect to the holder at least in the X direction of XY-plane coordinates along the mirror surface; a second holder-side positioning portion defining, through contact with the second positioning protruding portion, the position of the concave mirror with respect to the holder at least in the Y direction of the XY-plane coordinates; and a third holder-side positioning portion defining, through contact with the third positioning protruding portion, the position of
(Continued)

the concave mirror with respect to the holder at least in the Z direction orthogonal to the XY lane.

10 Claims, 13 Drawing Sheets

(52) U.S. Cl.
CPC ........... *G02B 7/1821* (2013.01); *G02B 27/01* (2013.01); *G02B 27/0101* (2013.01); *B60K 2370/334* (2019.05); *G02B 2027/0154* (2013.01)

(58) Field of Classification Search
USPC .......................... 359/631, 632, 849, 872, 869
See application file for complete search history.

(56) References Cited

U.S. PATENT DOCUMENTS

| | | | | |
|---|---|---|---|---|
| 4,655,563 A | * | 4/1987 | Plante | G02B 26/06 359/849 |
| 4,763,991 A | * | 8/1988 | Klotz, Jr. | G02B 7/004 359/872 |
| 5,151,809 A | * | 9/1992 | Meier | G02B 7/183 359/846 |
| 5,194,993 A | * | 3/1993 | Bedzyk | G02B 7/004 359/813 |
| 5,353,167 A | * | 10/1994 | Kuklo | G02B 7/1825 248/485 |
| 6,402,329 B1 | * | 6/2002 | Bailly | G02B 7/1822 248/476 |
| 8,322,870 B2 | * | 12/2012 | Miller | G02B 7/1827 359/849 |
| 2013/0169910 A1 | * | 7/2013 | Hatano | G02B 5/3083 349/96 |
| 2015/0062275 A1 | | 3/2015 | Masaki | |
| 2018/0180787 A1 | * | 6/2018 | Inoue et al. | G02B 5/3083 |

FOREIGN PATENT DOCUMENTS

| | | |
|---|---|---|
| JP | H03-084513 A | 4/1991 |
| JP | H09-210293 A | 8/1997 |
| JP | 2002-277814 A | 9/2002 |
| JP | 2004-291156 A | 10/2004 |
| JP | 2007-078434 A | 3/2007 |
| JP | 2011-107438 A | 6/2011 |
| JP | 2012-083141 A | 4/2012 |
| JP | 2013-178308 A | 9/2013 |
| JP | 2015-049265 A | 3/2015 |

* cited by examiner

MIRROR UNIT AND DISPLAY DEVICE

CROSS REFERENCE

This application is the U.S. National Phase under 35 U.S.C. § 371 of International Application No. PCT/JP2016/064320, filed on May 13, 2016, which claims the benefit of Japanese Application No. 2015-100703, filed on May 18, 2015, the entire contents of each are hereby incorporated by reference.

TECHNICAL FIELD

The present invention relates to a mirror unit and a display device.

BACKGROUND ART

For example, a mirror unit for reflecting light has been conventionally known in the field of optical instruments such as a head-up display. As disclosed in, for example, PTL 1, a mirror unit includes a concave mirror for magnifying display light while reflecting the display light and a holder holding the concave mirror. The concave mirror is bonded to the holder via a double-sided adhesive tape.

CITATION LIST

Patent Literature(s)

PTL 1: JP-A-2002-277814

SUMMARY OF INVENTION

Technical Problem(s)

In a configuration disclosed in PTL 1 cited above, the holder and the concave mirror may be bonded via a double-sided adhesive tape in a state in which the concave mirror is shifted from a desired position with respect to the holder. In this case, force may be applied to the concave mirror from the holder via an adhesive strength of the double-sided adhesive tape in an unintended direction, thereby distorting a mirror surface of the concave mirror. In particular, the concave mirror magnifies display light, and therefore, even in a case where the mirror surface is slightly distorted, an influence on display light reflected by the mirror unit, which is in turn an influence on an image displayed by projecting the display light, is not small.

The invention has been made in view of the above-mentioned circumstances, and an object is to provide a mirror unit and a display device, each of which restrains distortion of a mirror surface.

Solution to Problem(s)

In order to achieve the above-mentioned object, a mirror unit according to a first aspect of the invention includes: a mirror having a mirror surface for reflecting light; and a holder holding the mirror in a state in which the holder is bonded to the mirror, in which: the mirror has first to third mirror-side positioning portions; and the holder has a first holder-side positioning portion that is in contact with the first mirror-side positioning portion to determine a position of the mirror with respect to the holder in at least an X direction on an XY-plane coordinate along the mirror surface, a second holder-side positioning portion that is in contact with the second mirror-side positioning portion to determine a position of the mirror with respect to the holder in at least a Y direction on the XY-plane coordinate, and a third holder-side positioning portion that is in contact with the third mirror-side positioning portion to determine a position of the mirror with respect to the holder in at least a Z direction orthogonal to the XY plane.

In order to achieve the above-mentioned object, a display device according to a second aspect of the invention includes: a display unit for emitting display light showing an image; and a mirror unit according to the first aspect of the invention for causing a projection member to reflect the display light from the display unit.

Advantageous Effects of Invention

According to the invention, it is possible to restrain distortion of a mirror surface.

DESCRIPTION OF EMBODIMENTS

An embodiment of a display device including a mirror unit according to the invention will be described with reference to the drawings.

Figure 1:
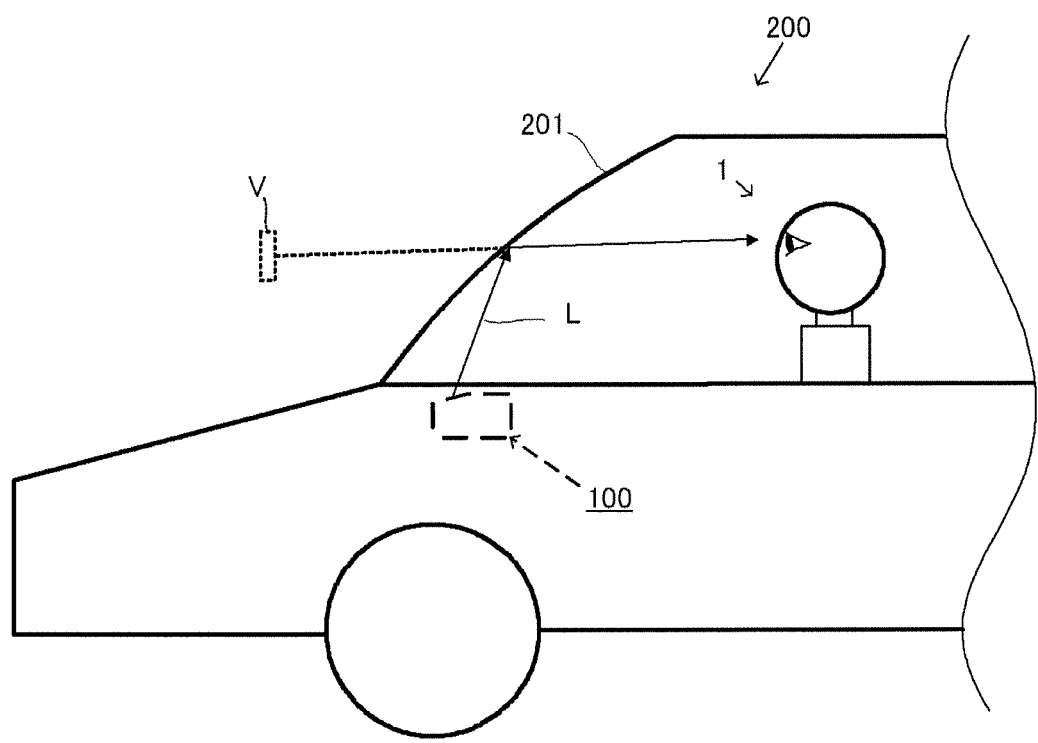
FIG. 1 is a schematic view of a vehicle in which a display device according to an embodiment of the invention is mounted.

As illustrated in FIG. 1, a display device 100 according to this embodiment is installed in, for example, a dashboard of a vehicle 200. The display device 100 is configured as a so-called head-up display device that emits display light L showing an image toward a windshield 201 (example of projection member) of the vehicle 200 and displays a virtual image V of the image with the display light L reflected by the windshield 201. When the virtual image V is displayed as described above, a viewer 1 (mainly a driver of the vehicle 200) visually recognizes an image displayed behind the windshield 201.

(Configuration of Display Device)

Figure 2:
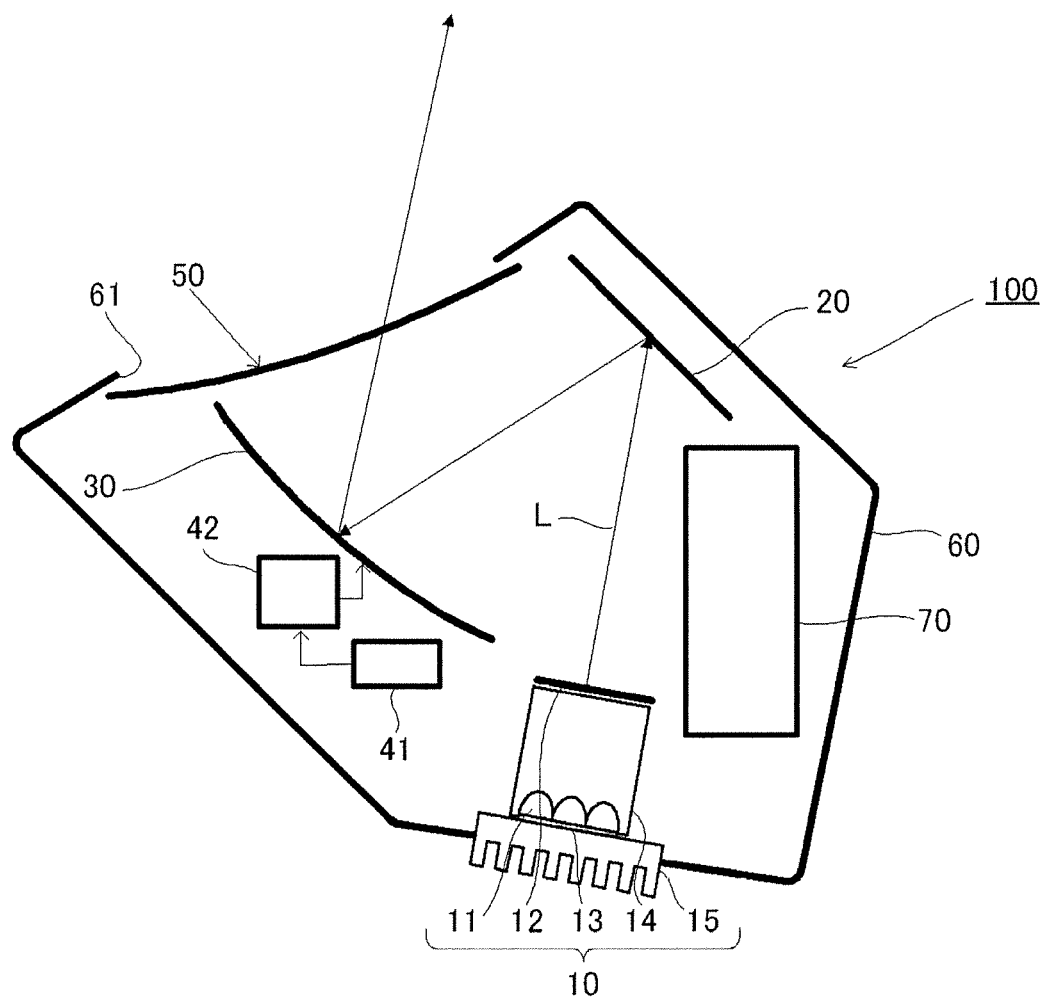
FIG. 2 is a schematic view illustrating a configuration of a display device according to an embodiment of the invention.

As illustrated in FIG. 2, the display device 100 includes a display unit 10, a reflecting mirror member 20, a mirror unit 30, a motor 41, a conversion mechanism 42, a housing 60, and a control unit 70.

The housing 60 is made of a non-light-transmissive resin material or metal material and has a hollow, substantially rectangular parallelepiped shape. In the housing 60, an opening portion 61 is provided at a position facing the windshield 201. The housing 60 includes a curved-plate like window portion 50 covering the opening portion 61. This window portion 50 is made of a light-transmissive resin material such as acryl through which display light L passes. Each configuration of the display device 100 is stored in the housing 60.

The display unit 10 emits display light L showing a predetermined image and specifically includes a light source 11, a liquid crystal display panel 12, a light-source substrate 13, a diffusion case 14, and a heat sink 15.

The light source 11 is made up of a plurality of LEDs (Light Emitting Diodes). The light source 11 is mounted on, for example, the light-source substrate 13 made of an aluminum substrate on which various kinds of wires are printed. The light source 11 emits light for illuminating the liquid crystal display panel 12. The light source 11 is electrically connected to the control unit 70 via the light-source substrate 13 and emits light under control of the control unit 70. The diffusion case 14 is made of resin such as polycarbonate to have white color. The diffusion case 14 is provided between the light source 11 and the liquid crystal display panel 12 and diffuses light from the light source 11 to thereby uniformly illuminate the liquid crystal display panel 12. The liquid crystal display panel 12 switches a transmitted/non-transmitted state of each pixel under control of the control unit 70, thereby emitting display light L showing a predetermined image (such as an image showing vehicle information) upon receipt of light from the light source 11. The heat sink 15 is made of metal such as aluminum and radiates heat generated in the light source 11.

As illustrated in FIG. 2, the reflecting mirror member 20 reflects display light L emitted by the display unit 10 toward the mirror unit 30. The reflecting mirror member 20 is formed by, for example, vacuum-depositing aluminum on die-molded polycarbonate resin.

The mirror unit 30 reflects display light L emitted from the display unit 10 and reflected by the reflecting mirror member 20 toward the windshield 201 while magnifying the display light L. A specific configuration of the mirror unit 30 will be described in detail below.

Figure 13:
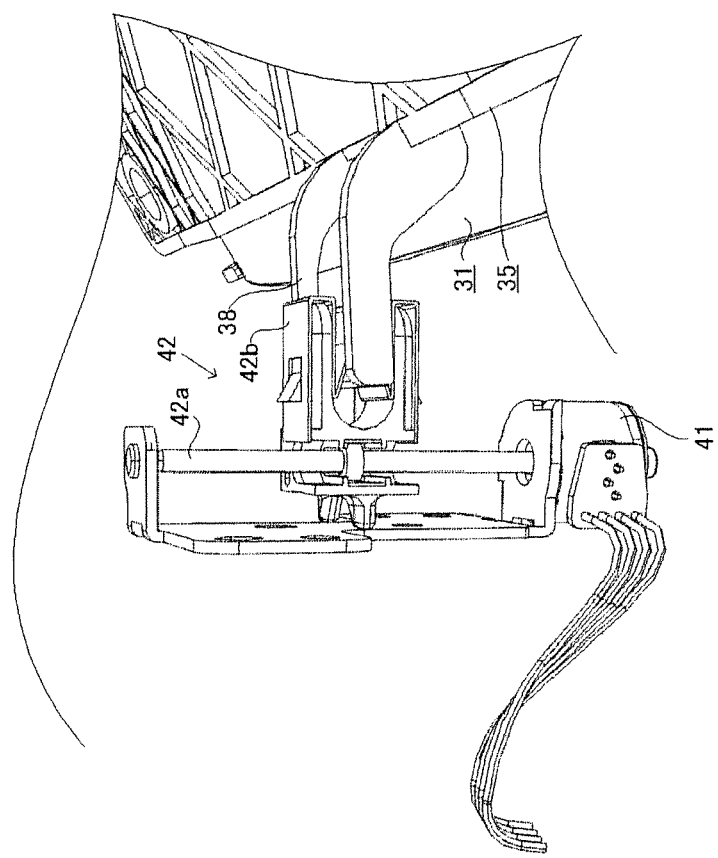
FIG. 13 is an enlarged perspective view of a motor and a conversion mechanism according to an embodiment of the invention.

The motor 41 is fixed in the housing 60 and drives under control of the control unit 70. The conversion mechanism 42 is a mechanism for converting a rotational motion of the motor 41 into a linear motion and, as illustrated in FIG. 13, specifically includes a screw shaft 42a whose circumference is threaded and a movable portion 42b apart of which is engaged with the circumference of the screw shaft 42a. The movable portion 42b holds a part (holding portion 38 described below) of the mirror unit 30. The screw shaft 42a axially rotates in accordance with drive of the motor 41, thereby moving the movable portion 42b along the screw shaft 42a.

(Configuration of Mirror Unit)

Figure 3:
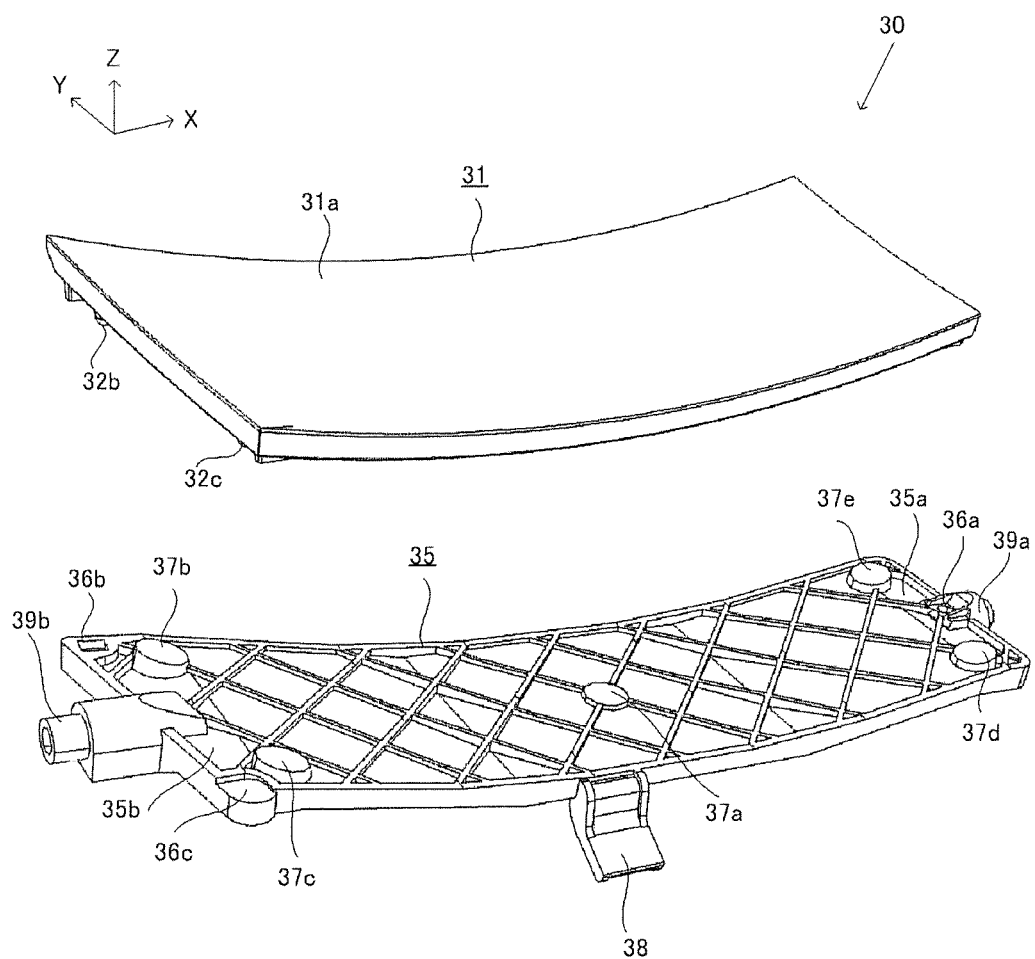
FIG. 3 is an exploded perspective view of a mirror unit according to an embodiment of the invention.
Figure 4:
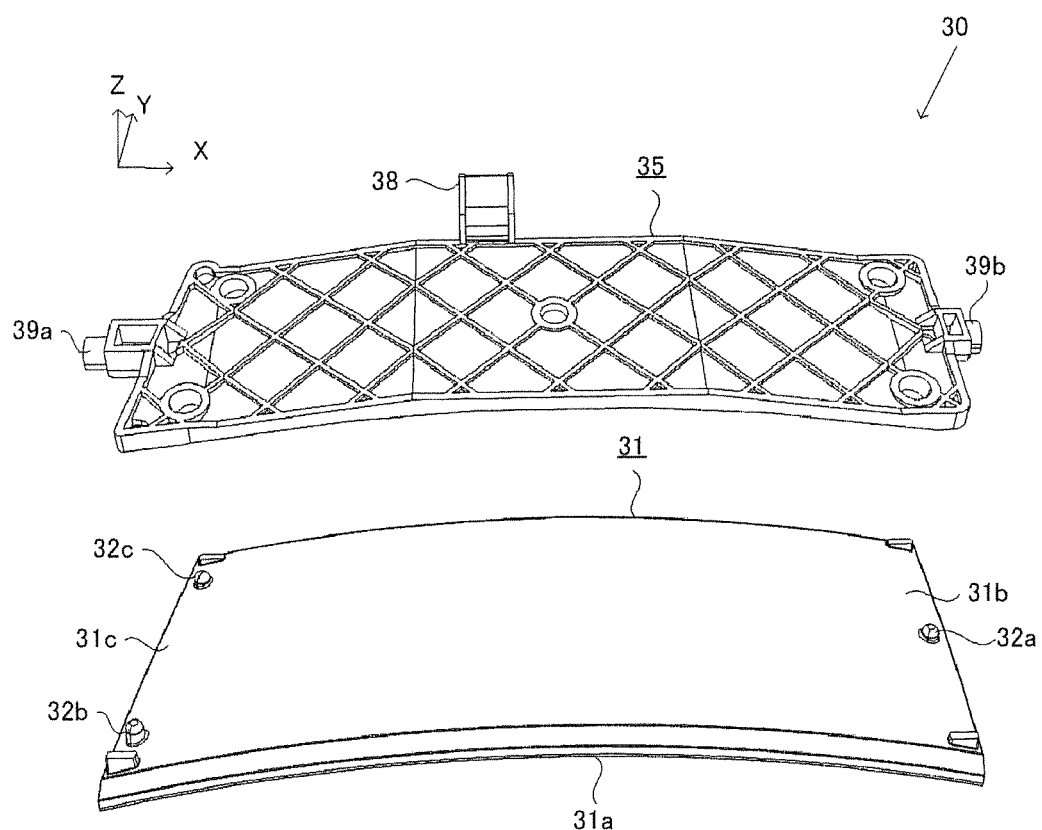
FIG. 4 is an exploded perspective view of a mirror unit according to an embodiment of the invention.

As illustrated in FIG. 3 and FIG. 4, the mirror unit 30 includes a concave mirror 31 that is an example of a mirror for reflecting display light L and a holder 35 holding the concave mirror 31.

The concave mirror 31 is formed to have a substantially rectangular plate shape and is curved along a longitudinal direction thereof. Specifically, the concave mirror 31 includes a base made of synthetic resin and having a concave curved surface having a predetermined curvature and a mirror surface 31a made of metal such as aluminum vacuum-deposited on the curved surface of the base. The base of the concave mirror 31 may be made of synthetic resin, for example, cycloolefin polymer (COP) resin in order to form a curved surface of the mirror surface 31a with high accuracy. Further, the base of the concave mirror 31 is not limited to synthetic resin and may be made of glass.

In this embodiment, on an XY-plane coordinate along the mirror surface 31a, an X direction corresponds to the longitudinal direction of the concave mirror 31 and a Y direction orthogonal to this X direction corresponds to a lateral direction of the concave mirror 31. Further, a Z direction orthogonal to an XY plane corresponds to a thickness direction of the concave mirror 31.

Figure 6:
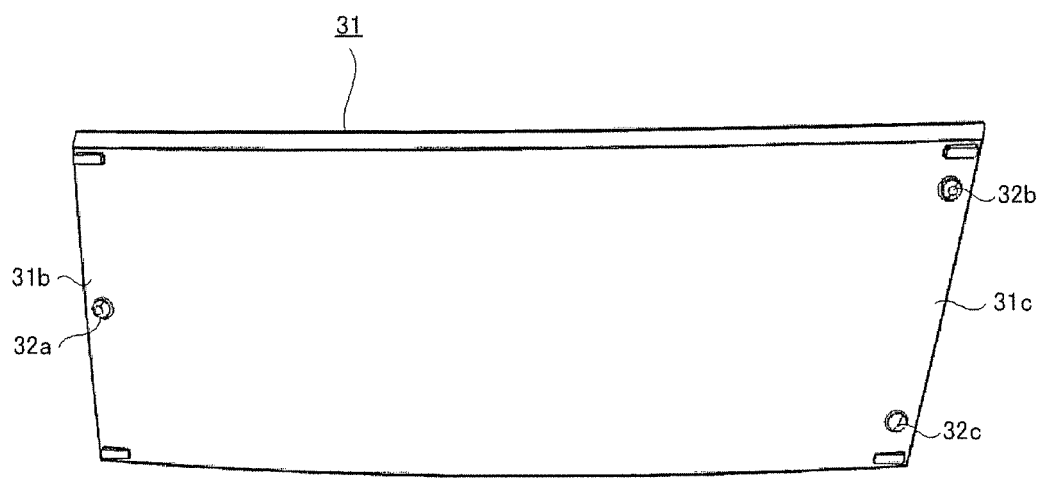
FIG. 6 is a front view of a concave mirror according to an embodiment of the invention.

As illustrated in FIG. 4 and FIG. 6, the concave mirror 31 has, on a back surface (surface facing the holder 35) thereof, first to third positioning protruding portions 32a to 32c formed to have a protruding shape. The first to third positioning protruding portions 32a to 32c are examples of first to third mirror-side positioning portions. A tip of each of the positioning protruding portions 32a to 32c projecting in a direction away from the mirror surface 31a of the concave mirror 31 is formed to have a spherical and cylindrical shape. As illustrated in FIG. 4, the second positioning protruding portion 32b is formed to be higher than the first positioning protruding portion 32a and the third positioning protruding portion 32c in the Z direction. The first positioning protruding portion 32a is formed on a first end portion 31b in the longitudinal direction (X direction) of the concave mirror 31. The first positioning protruding portion 32a is positioned at the center in the lateral direction (Y direction) of the concave mirror 31. The second positioning protruding portion 32b and the third positioning protruding portion 32c are formed on a second end portion 31c that is opposite to the first end portion 31b in the longitudinal direction of the concave mirror 31. The second positioning protruding portion 32b is positioned at one corner portion on the second end portion 31c side on the back surface of the concave mirror 31, and the third positioning protruding portion 32c is positioned at the other corner portion on the second end portion 31c side on the back surface of the concave mirror 31. That is, a distance from the first positioning protruding portion 32a to the second positioning protruding portion 32b and a distance from the first positioning protruding portion 32a to the third positioning protruding portion 32c are equivalent distances and are set as large as possible.

The holder 35, as well as the concave mirror 31, is formed to have a substantially rectangular plate shape and is curved in a longitudinal direction thereof. The holder 35 is formed by using synthetic resin, for example, a polymer alloy of polycarbonate (PC) and polyethylene terephthalate (PET). Further, the holder 35 may be formed by, for example, mixing about 10% of glass fibers with this PC/PET polymer alloy in order to improve rigidity thereof.

Figure 7:
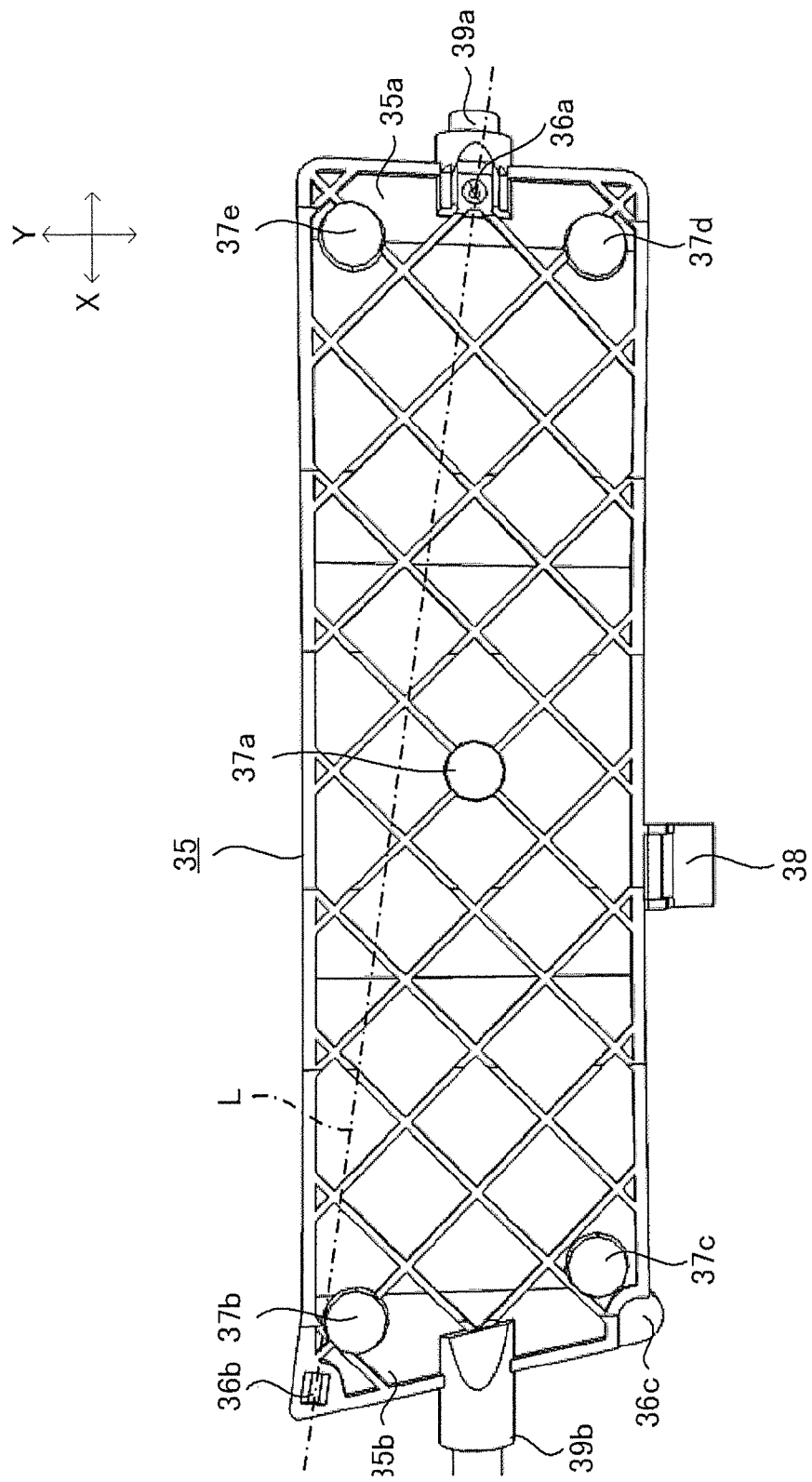
FIG. 7 is a front view of a holder according to an embodiment of the invention.

As illustrated in FIG. 3 and FIG. 7, the holder 35 has, on a surface (surface facing the back surface of the concave mirror 31) thereof, first to third positioning recessed portions 36a to 36c formed to have a concave shape. The first to third positioning recessed portions 36a to 36c are examples of first to third holder-side positioning portions. The first positioning recessed portion 36a of the holder 35 is positioned to correspond to the first positioning protruding portion 32a of the concave mirror 31, the second positioning recessed portion 36b of the holder 35 is positioned to correspond to the second positioning protruding portion 32b of the concave mirror 31, and the third positioning recessed portion 36c of the holder 35 is positioned to correspond to the third positioning protruding portion 32c of the concave mirror 31.

Figure 5:
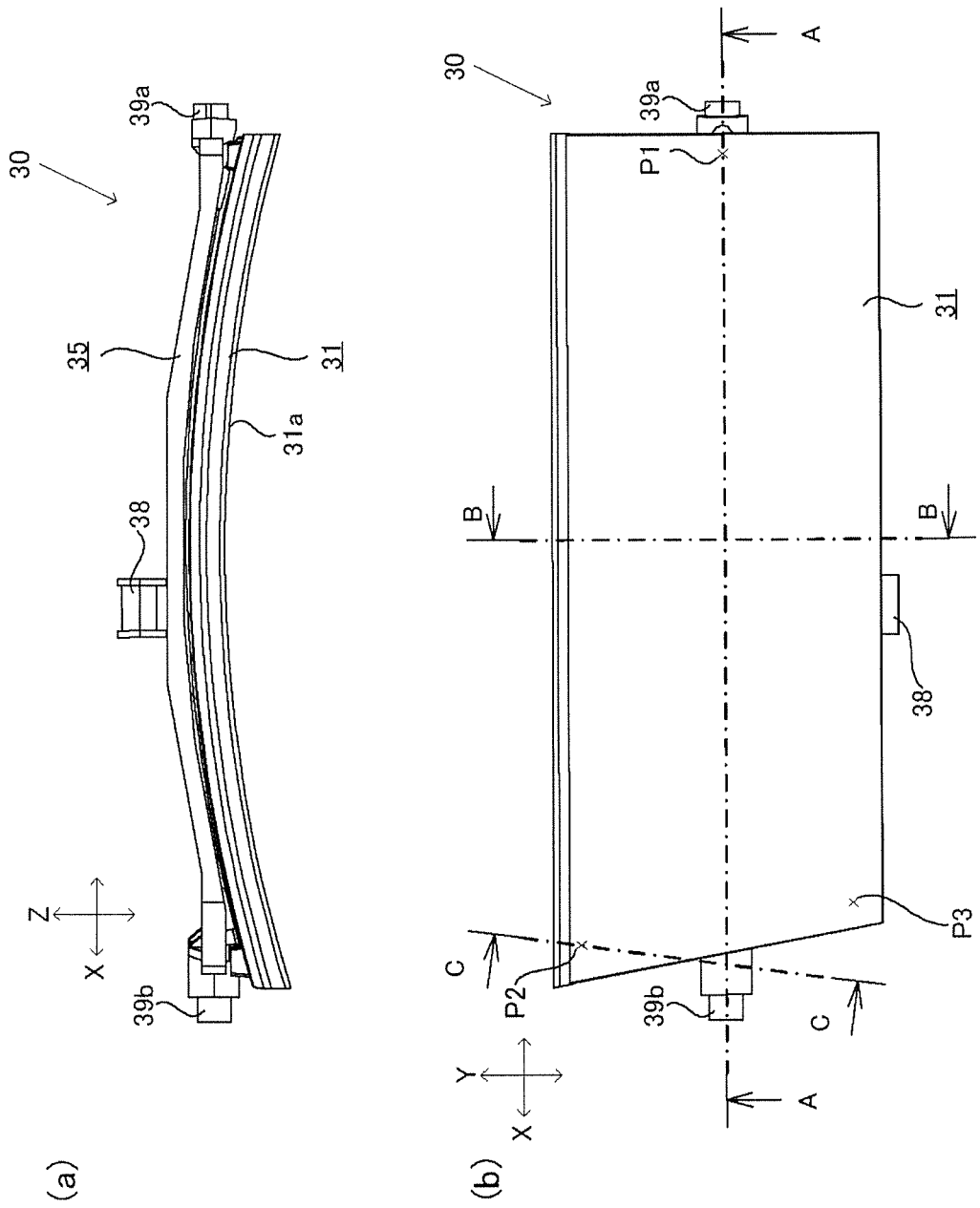
FIG. 5(a) according to an embodiment of the invention is a plan view of a mirror unit.
FIG. 5(b) is a front view of the mirror unit.
Figure 8:
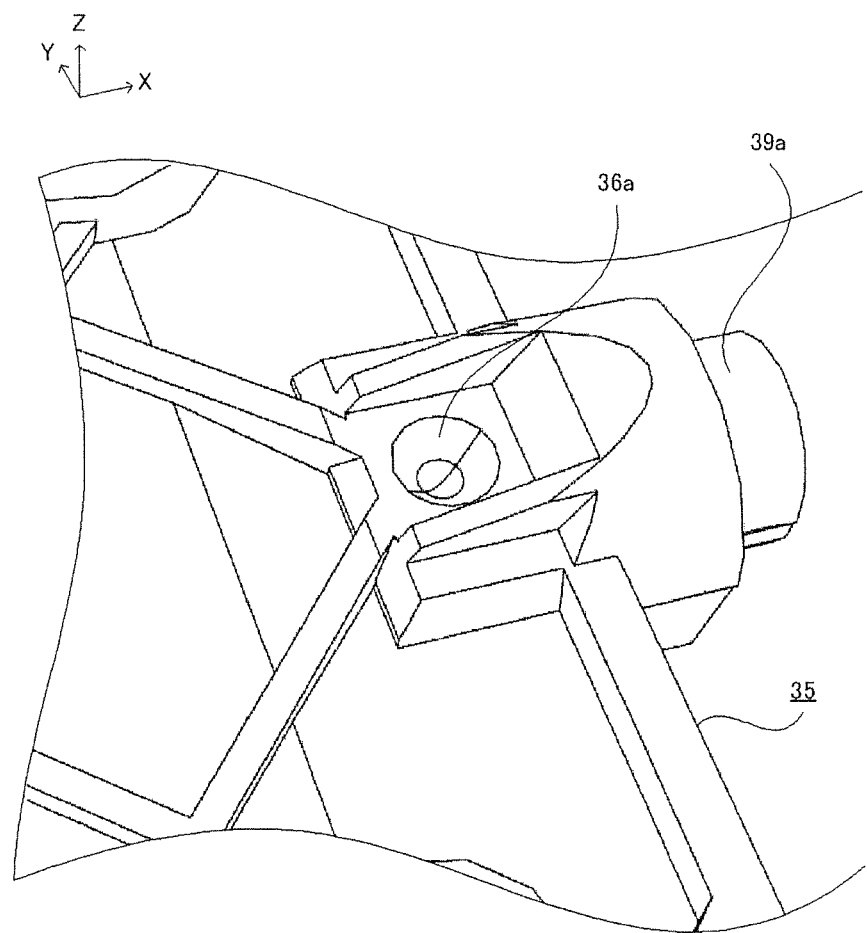
FIG. 8 is an enlarged perspective view of a first positioning recessed portion of a holder according to an embodiment of the invention.
Figure 12:
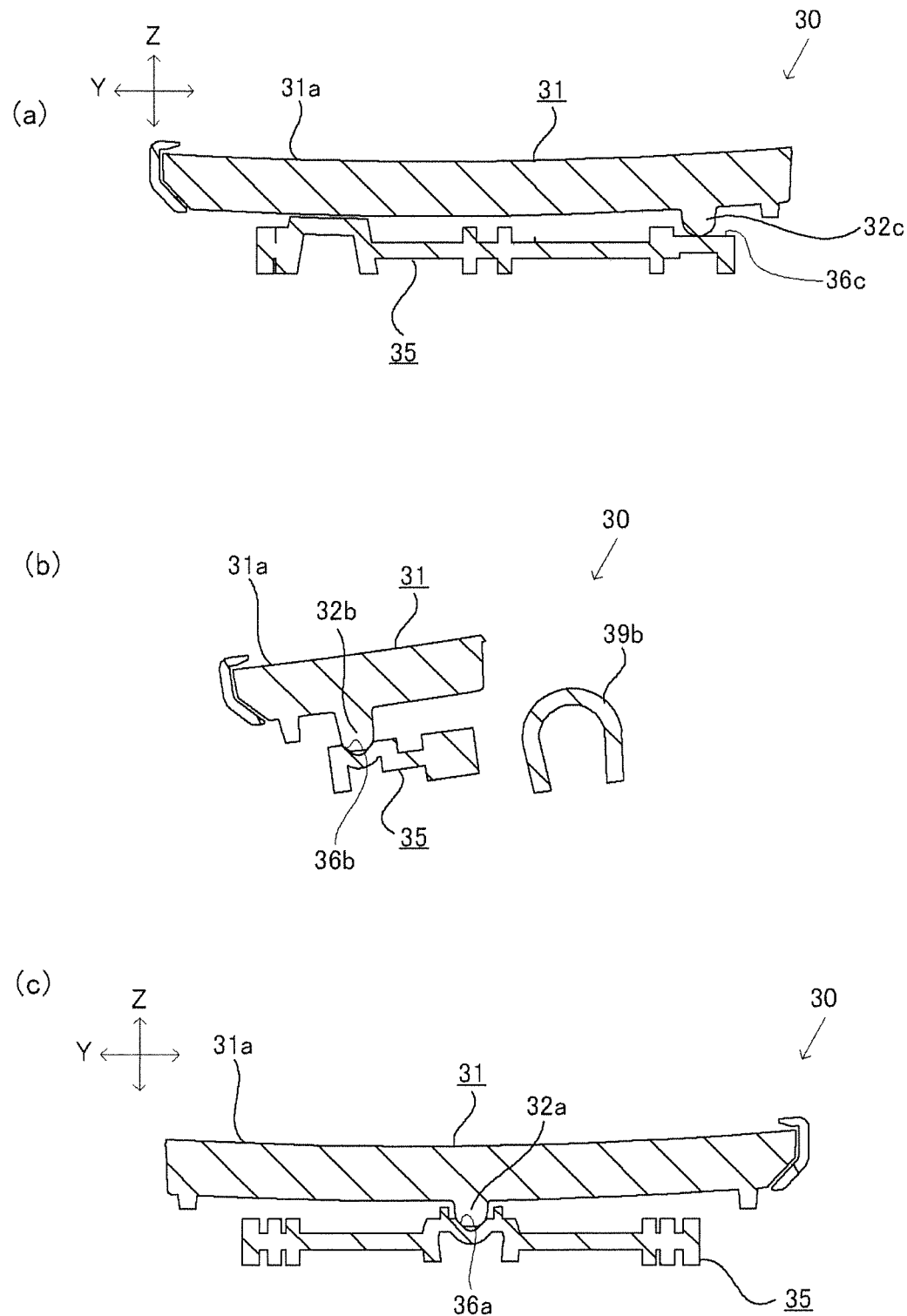
FIG. 12(a) according to an embodiment of the invention is a cross-sectional view taken along the line G-G of FIG. 11.
FIG. 12(b) is a cross-sectional view taken along the line F-F of FIG. 11.
FIG. 12(c) is a cross-sectional view taken along the line H-H of FIG. 11.

Specifically, the first positioning recessed portion 36a of the holder 35 is formed on a first end portion 35a in the longitudinal direction of the holder 35. The first positioning recessed portion 36a is positioned at the center in the lateral direction of the concave mirror 31. As illustrated in FIG. 8 and FIG. 12(c), the first positioning recessed portion 36a has a conical shape having a spherical tip. The first positioning recessed portion 36a is formed to have a size similar to that of the tip portion of the first positioning protruding portion 32a. When the tip portion of the first positioning protruding portion 32a abuts on the first positioning recessed portion 36a, a position of the concave mirror 31 with respect to the holder 35 in the X direction, the Y direction, and the Z direction is determined at this first abutting position P1 (see FIG. 5(b)).

As illustrated in FIG. 3 and FIG. 7, the second positioning recessed portion 36b and the third positioning recessed portion 36c are formed on a second end portion 35b that is opposite to the first end portion 35a in the longitudinal direction of the holder 35. The second positioning recessed portion 36b is positioned at one corner portion on the second end portion 35b side on the surface of the holder 35, and the third positioning recessed portion 36c is positioned at the other corner portion on the second end portion 35b side on the surface of the holder 35.

Figure 9:
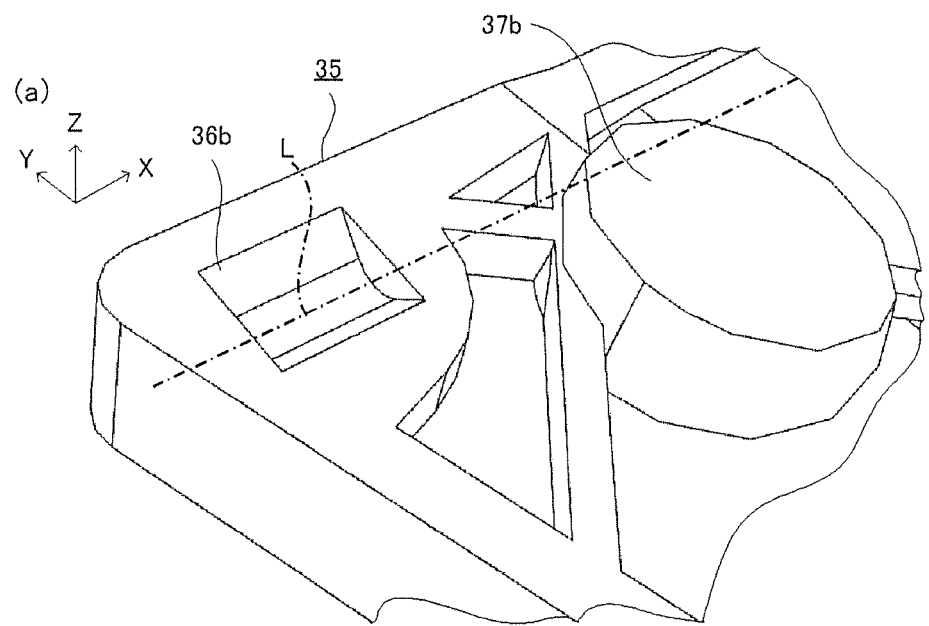
FIG. 9(a) according to an embodiment of the invention is an enlarged perspective view of a second positioning recessed portion of a holder.
FIG. 9(b) is an enlarged perspective view of a third positioning recessed portion of the holder.
Figure 9:
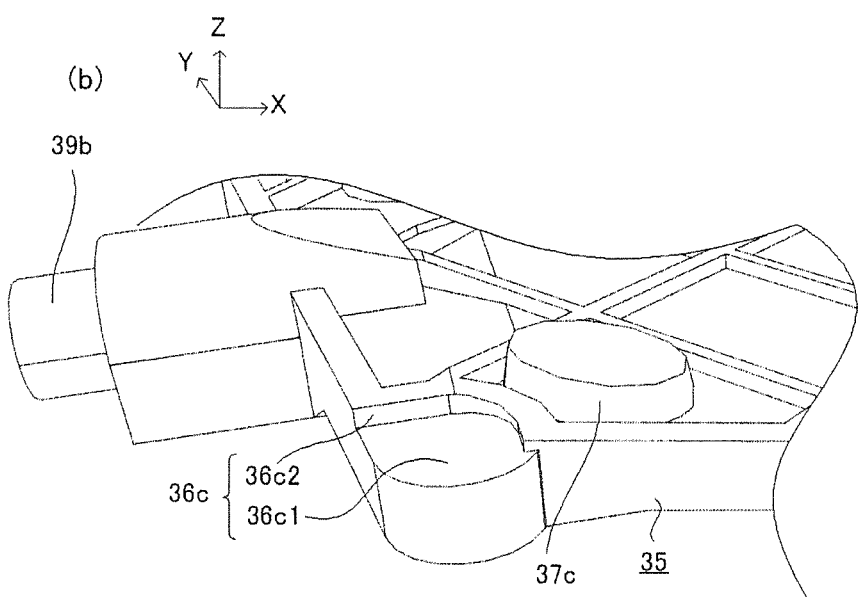

As illustrated in FIG. 7 and FIG. 9, the second positioning recessed portion 36b of the holder 35 is formed to have a substantially V shape when the holder 35 is seen from the surface and extend along a virtual connecting line L connecting the second positioning recessed portion 36b and the first positioning recessed portion 36a. This connecting line L extends in the X direction, specifically, in a direction in which an angle between the connecting line L and the X direction is smaller than an angle between the connecting line L and the Y direction. A length of the second positioning recessed portion 36b in a direction along the connecting line L is set so that the second positioning protruding portion 32b is positioned in the second positioning recessed portion 36b, regardless of a shape error of the holder 35 (shape error in the X direction in particular). As illustrated in FIG. 12(b) that is a cross-sectional view taken along the line F-F of FIG. 11, the second positioning recessed portion 36b is configured so that the second positioning protruding portion 32b abuts on a pair of inner surfaces facing each other in a direction orthogonal to the connecting line L (direction along the Y direction). When the tip portion of the second positioning protruding portion 32b abuts on the second positioning recessed portion 36b, a position of the concave mirror 31 with respect to the holder 35 in the Y direction and the Z direction is determined at this second abutting position P2 (see FIG. 5(b)). By positioning at the first and second abutting positions P1 and P2, rotation of the concave mirror 31 on the XY plane and rotation thereof on a YZ plane toward the holder 35, which have the first abutting position P1 as the center of rotation, are restrained with respect to the holder 35. Further, because the second positioning recessed portion 36b extends in the substantially X direction as described above, a position of the concave mirror 31 with respect to the holder 35 in the X direction is not determined at the second abutting position P2.

As illustrated in the enlarged view of FIG. 9(b), the third positioning recessed portion 36c of the holder 35 has a bottom surface 36c1 that is an example of an abutting surface extending along the XY plane and a side surface 36c2 formed to have a substantially J shape. The side surface 36c2 extends from an end surface extending in a lateral direction of the holder 35 to an end surface extending in the longitudinal direction of the holder 35. The third positioning recessed portion 36c is open toward an external space from a side surface of the holder 35. An area of the bottom surface 36c1 is set so that the third positioning protruding portion 32c is positioned on the bottom surface 36c1, regardless of a shape error of the holder 35 in the X direction and the Y direction. As illustrated in FIG. 12(a), when the tip portion of the third positioning protruding portion 32c abuts on the bottom surface 36c1 of the third positioning recessed portion 36c, a position of the concave mirror 31 with respect to the holder 35 in the Z direction is determined at a third abutting position P3 (see FIG. 5(b)) thereof. By positioning at the first to third abutting positions P1, P2, and P3, rotation of the concave mirror 31 with respect to the holder 35 in the Z direction toward the holder 35, the rotation having a line segment (not shown) connecting the first abutting position P1 and the second abutting position P2 as a center, is restrained. The third positioning protruding portion 32c does not abut on the side surface 36c2, and therefore a position of the concave mirror 31 in the X direction and the Y direction is not determined at the third abutting position P3.

Figure 10:
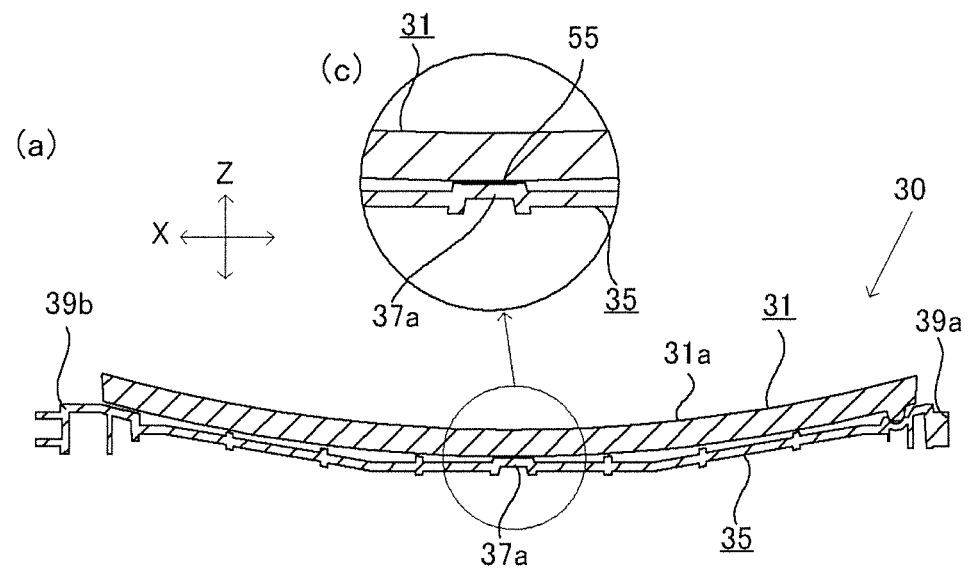
FIG. 10(a) according to an embodiment of the invention is a cross-sectional view taken along the line A-A of FIG. 5(b)
FIG. 10(b) is a cross-sectional view taken along the line B-B of FIG. 5(b)
FIG. 10(c) is a partial enlarged view of FIG. 10(a).
Figure 10:
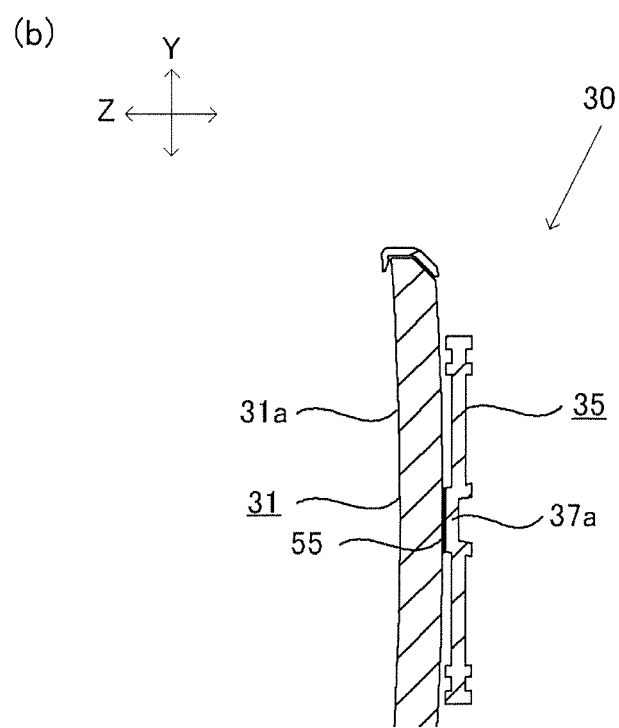
Figure 11:
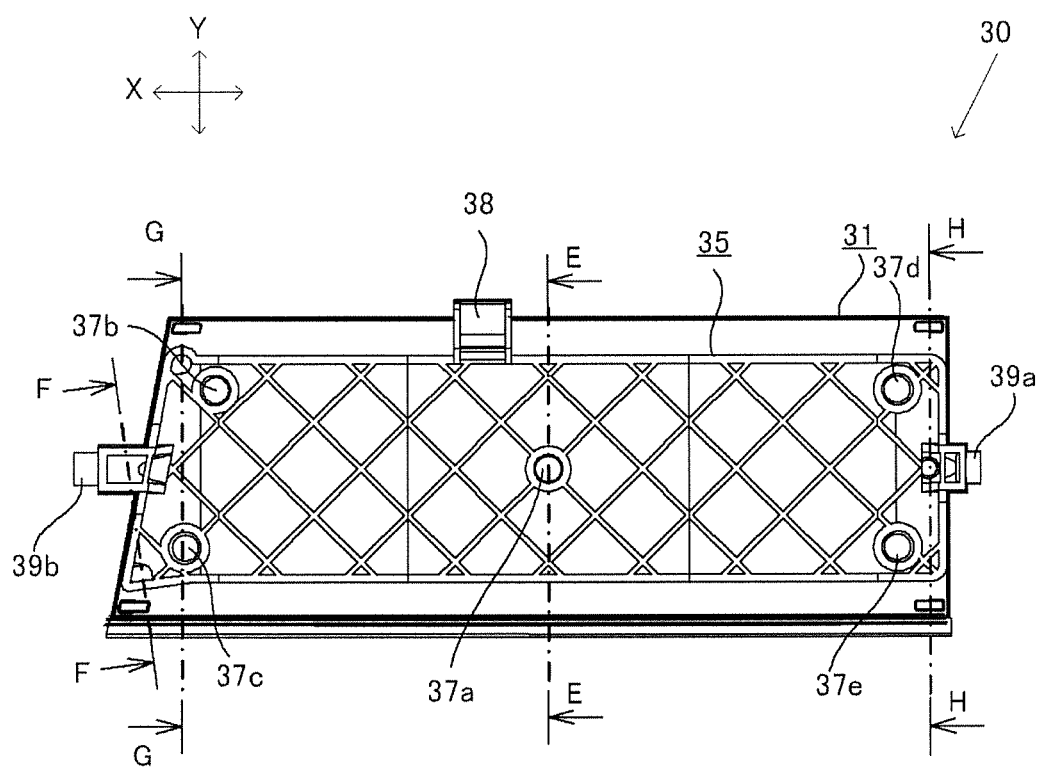
FIG. 11 is a rear view of a mirror unit according to an embodiment of the invention.

Further, as illustrated in FIG. 7 and FIG. 11, the holder 35 has first to fifth disk-shaped bonding surface portions 37a to 37e on the surface thereof. The first bonding surface portion 37a is positioned at the center of the surface of the holder 35, and the second to fifth bonding surface portions 37b to 37e are positioned at respective corner portions of the surface of the holder 35. The second bonding surface portion 37b is positioned in the vicinity of the second positioning recessed portion 36b and between the second positioning recessed portion 36b and the first bonding surface portion 37a. The third bonding surface portion 37c is positioned in the vicinity of the third positioning recessed portion 36c and between the third positioning recessed portion 36c and the first bonding surface portion 37a. The fourth bonding surface portion 37d is positioned at one corner portion on the first end portion 35a side on the surface of the holder 35, and the fifth bonding surface portion 37d is positioned at the other corner portion on the first end portion 35a side on the surface of the holder 35. In a state in which the concave mirror 31 is assembled into the holder 35, each of the bonding surface portions 37a to 37e faces the back surface of the concave mirror 31 while having a gap of a certain distance in the thickness direction of the holder 35. FIG. 10(c) illustrates only a gap between the first bonding surface portion 37a and the back surface of the concave mirror 31. However, similar gaps are also provided between the second to fifth bonding surface portions 37b to 37e and the back surface of the concave mirror 31. An upper surface of each of the bonding surface portions 37a to 37e, which faces the back surface of the concave mirror 31, corresponds to a bonding surface. As illustrated in FIGS. 10(a) to (c), a part between the first bonding surface portion 37a and the back surface of the concave mirror 31 is filled with an adhesive 55. Parts between the second to fifth bonding surface portions 37b to 37e and the back surface of the concave mirror 31 are similarly filled with the adhesive 55. The holder 35 and the concave mirror 31 are bonded by an adhesive strength of this adhesive 55. For example, a solid adhesive containing a heat reversible resin component may be employed as the adhesive. The adhesive is appropriately selected in accordance with materials of the base of the concave mirror and the holder 35 serving as targets to be bonded. Specifically, in a case where the base of the concave mirror 31 is made of COP and the holder 35 is made of PC/PET as an example, the concave mirror 31 and the holder 35 may be bonded by using an adhesive called a moisture-curable type reactive hot-melt adhesive (Jet-Weld), the adhesive containing urethane resin as a main component and being obtained by imparting a characteristic of a reaction system to a hot melt.

Further, as illustrated in FIG. 3, the holder 35 includes, on both side surfaces extending in the lateral direction thereof, first and second cylindrical rotary shaft portions 39a and 39b extending in the longitudinal direction thereof. The first rotary shaft portion 39a is provided at a position corresponding to the first positioning recessed portion 36a, and the second rotary shaft portion 39b is provided between the second positioning recessed portion 36b and the third positioning recessed portion 36c. The holder 35 is rotatably supported in the housing 60 via the first and second rotary shaft portions 39a and 39b.

Further, as illustrated in FIG. 3, the holder 35 includes a substantially L-shaped holding portion 38 on a side surface on the third positioning recessed portion 36c side between both side surfaces extending in the longitudinal direction thereof. As illustrated in FIG. 13, the holding portion 38 is positioned at the center in the longitudinal direction of the holder 35 and is engaged with the movable portion 42b of the conversion mechanism 42. When the movable portion 42b is moved along the screw shaft 42a, rotation force is applied from the movable portion 42b to the holding portion 38, which is in turn applied to the holder 35. With this, the holder 35 can be rotated around the first and second rotary shaft portions 39a and 39b. An angle of incidence of display light L on the mirror surface 31a of the mirror unit 30 is changed in accordance with rotation of the holder 35, and an optical path of the display light L reflected by the mirror unit 30 is changed, and therefore a display position of a virtual image V in the Z direction is changed.

(Method of Assembling Mirror Unit)

Next, a method of assembling the mirror unit 30 will be described.

First, for example, an adhesive liquefied by heating is applied to the surface (surface facing the concave mirror 31) of each of the bonding surface portions 37a to 37e. Then, the concave mirror 31 is assembled into the holder 35 to which the adhesive has been applied. At this time, the first positioning protruding portion 32a of the concave mirror 31 is positioned in the first positioning recessed portion 36a of the holder 35, the second positioning protruding portion 32b of the concave mirror 31 is positioned in the second positioning recessed portion 36b of the holder 35, and the third positioning protruding portion 32c of the concave mirror 31 is positioned in the third positioning recessed portion 36c of the holder 35. The applied adhesive is cured by, for example, reacting with moisture in the air. This curing form is different depending on the kind of adhesive to be selected. As illustrated in FIGS. 10(a) to (c), the cured adhesive 55 bonds the concave mirror 31 and the holder 35 (to be exact, the first to fifth bonding surface portions 37a to 37e). Hereinabove, assembly of the mirror unit 30 is completed.

(Actions and Effects)

The embodiment described above has the following actions and effects.

(1) As illustrated in FIG. 4, the concave mirror 31 has the first to third positioning protruding portions 32a to 32c. As illustrated in FIG. 3, the holder 35 has the first to third positioning recessed portions 36a to 36c corresponding to the first to third positioning protruding portions 32a to 32c. The first positioning recessed portion 36a is in contact with the first positioning protruding portion 32a to thereby determine a position of the concave mirror 31 with respect to the holder 35 in at least the X direction on the XY-plane coordinate along the mirror surface 31a. The second positioning recessed portion 36b is in contact with the second positioning protruding portion 32b to thereby determine a position of the concave mirror 31 with respect to the holder 35 in at least the Y direction on the XY-plane coordinate along the mirror surface 31a. The third positioning recessed portion 36c is in contact with the third positioning protruding portion 32c to thereby determine a position of the concave mirror 31 with respect to the holder 35 in the Z direction orthogonal to the XY plane. As described above, when the concave mirror 31 is positioned with respect to the holder 35 at three points in the X, Y, and Z directions, the concave mirror 31 is restrained from being shifted from the holder 35. Therefore, unintended external force is restrained from being applied to the concave mirror 31 from the holder 35 via the adhesive 55 in accordance with this shift, which in turn restrains distortion of the mirror surface 31a.

(2) The first positioning recessed portion 36a is in contact with the first positioning protruding portion 32a to thereby determine a position of the concave mirror 31 with respect to the holder 35 in the X direction, the Y direction, and the Z direction. Further, the second positioning recessed portion 36b is in contact with the second positioning protruding portion 32b to thereby determine a position of the concave mirror 31 with respect to the holder 35 in the Y direction and the Z direction. Furthermore, as described above, the third positioning recessed portion 36c is in contact with the third positioning protruding portion 32c to thereby determine a position of the concave mirror 31 with respect to the holder 35 in the Z direction. That is, the second positioning recessed portion 36b does not restrict the second positioning protruding portion 32b in the X direction, and the third positioning recessed portion 36c does not restrict the third positioning protruding portion 32c in the X direction and the Y direction. As described above, by positioning the concave mirror 31 with respect to the holder 35 under mild restrictions, unintended external force is restrained from being applied to the concave mirror 31 from the holder 35 via the adhesive 55. With this, it is possible to restrain distortion of the mirror surface 31a.

(3) As illustrated in FIG. 7, the second positioning recessed portion 36b has a concave shape extending along the virtual connecting line L connecting the first positioning recessed portion 36a and the second positioning recessed portion 36b. The whole holder 35 is generally made of resin, and therefore shape accuracy thereof is low, as compared to the concave mirror 31. In this embodiment, even in a case where a shape error (shape error in the X direction in particular) occurs in the holder 35, the second positioning protruding portion 32b is positioned in the second positioning recessed portion 36b. Therefore, the concave mirror 31 is held by the holder 35 more securely.

Further, as illustrated in FIG. 9(b), the third positioning recessed portion 36c has the bottom surface 36c1 that is an example of an abutting surface on which the tip of the first positioning protruding portion 32a abuts. For example, this bottom surface 36c1 extends along the XY plane and is set to have an area larger than that of the first positioning recessed portion 36a. With this, the third positioning protruding portion 32c abuts on the bottom surface 36c1 of the third positioning recessed portion 36c, regardless of a shape error of the holder 35 in the X direction and the Y direction. Therefore, the concave mirror 31 is held by the holder 35 more securely.

(4) As illustrated in FIG. 3, the first positioning recessed portion 36a is provided in the first end portion 35a in the X direction of the holder 35, and the second positioning recessed portion 36b and the third positioning recessed portion 36c are provided far from each other in the Y direction in the second end portion 35b that is opposite to the first end portion 35a. As described above, when the first to third positioning recessed portions 36a to 36c are arranged as far as possible, the concave mirror 31 can be held by the holder 35 with high accuracy.

(5) As illustrated in FIG. 3, the holder 35 has the first to fifth bonding surface portions 37a to 37e facing the back surface of the concave mirror 31 which is opposite to the mirror surface 31a while having gaps of a certain distance. As illustrated in FIGS. 10(a) to (c), the gaps between the first to fifth bonding surface portions 37a to 37e and the back surface of the concave mirror 31 are filled with the adhesive 55. Therefore, a position of the concave mirror 31 is restrained from being shifted from the holder 35 in a case where the concave mirror 31 and the holder 35 are bonded.

Further, the first to fifth bonding surface portions 37a to 37e are uniformly arranged on the back surface of the concave mirror 31. Therefore, force is applied to the concave mirror 31 from the holder 35 via the adhesive 55 with a good balance. Thus, force is restrained from being applied to the concave mirror 31 from the holder 35 to distort the mirror surface 31a of the concave mirror 31.

Further, for example, when a liquid adhesive is employed at the time of application, the adhesive is sandwiched between the first to fifth bonding surface portions 37a to 37e and the back surface of the concave mirror 31 and is appropriately deformed. Herein, in a case where a double-sided adhesive tape is used as in PTL 1 cited above, a position of the concave mirror may be shifted from the holder due to a thickness of the double-sided adhesive tape, surface roughness of a part of the concave mirror or holder to which the double-sided adhesive tape is applied, or the like. Regarding this point, in this embodiment, the adhesive flows along the above-mentioned gaps, and therefore a positional shift of the concave mirror 31 in PTL 1 cited above is restrained.

(6) As illustrated in FIG. 2, the mirror unit 30 of this embodiment is applied to the display device 100 and reflects display light L while magnifying the display light L. Therefore, even slight distortion generated in the concave mirror 31 of the mirror unit 30 may largely distort a virtual image. Therefore, a mirror surface of a mirror unit to be applied to the display device is particularly demanded to have high shape accuracy. Regarding this point, in this embodiment, distortion of the mirror surface 31a is restrained as described above, and therefore the mirror unit 30 is preferably applied to the display device 100.

Modification Example

Note that the above-mentioned embodiment can be implemented in the following forms in which the above-mentioned embodiment is appropriately modified.

It is possible to appropriately change the configuration of the display device 100 in the above-mentioned embodiment. For example, the reflecting mirror member 20 may be omitted and the mirror unit 30 may be directly irradiated with display light L from the display unit 10. Further, the motor 41 and the conversion mechanism 42 may be omitted. In this case, the mirror unit 30 is fixedly installed in the housing 60, and therefore both rotary shaft portions 39a and 39b and the holding portion 38 of the mirror unit 30 may be omitted.

In the above-mentioned embodiment, the first positioning protruding portion 32a is positioned at the center in the lateral direction of the concave mirror 31 but may be positioned at a corner portion of the concave mirror 31, for example, a corner portion corresponding to the fourth bonding surface portion 37d or fifth bonding surface portion 37e of the holder 35. It is necessary to change a position of the first positioning recessed portion 36a of the holder 35 accordingly.

Further, positions of the first to third positioning recessed portions 36a to 36c of the holder 35 may be appropriately replaced. It is possible to replace positions of the first to third positioning protruding portions 32a to 32c of the concave mirror 31 accordingly.

Furthermore, the number of positioning recessed portions of the holder and the number of positioning protruding portions of the concave mirror may be increased. For example, in addition to the second positioning recessed portion 36b, a fourth positioning recessed portion may be formed at a position along the connecting line L so as to have a shape same as that of the second positioning recessed portion 36b. In this case, a fourth positioning protruding portion corresponding to this fourth positioning recessed portion is newly provided in the concave mirror 31. Similarly, a new positioning recessed portion and positioning protruding portion may be provided to have shapes same as those of the first positioning protruding portion 32a and the first positioning recessed portion 36a, and a new positioning recessed portion and positioning protruding portion may be provided to have shapes same as those of the third positioning protruding portion 32c and the third positioning recessed portion 36c.

In the above-mentioned embodiment, the first to third positioning recessed portions 36a to 36c are formed on the holder 35, and the first to third positioning protruding portions 32a to 32c are formed on the concave mirror 31. However, on the contrary, first to third positioning protruding portions may be formed on the holder 35, and first to third positioning recessed portions may be formed on the concave mirror 31.

Shapes of the first to third positioning recessed portions 36a to 36c of the holder 35 may be appropriately changed. For example, all the positioning recessed portions may have shapes similar to that of the first positioning recessed portion 36a. With this configuration, it is possible to have at least the above-mentioned action and effect (1).

Further, the first positioning recessed portion 36a may be formed to have a concave shape extending in the Y direction or a direction orthogonal to the connecting line L. With this configuration, the first positioning recessed portion 36a is in contact with the first positioning protruding portion 32a to thereby determine a position of the concave mirror 31 with respect to the holder 35 in the X direction and the Z direction. Further, the first positioning recessed portion 36a is formed to have a conical shape but may be formed to have a cylindrical shape. In this case, the concave mirror 31 is not positioned in the Z direction by the first positioning recessed portion or the first positioning protruding portion. From a similar point of view, the second positioning recessed portion 36b may be formed to have, for example, a U shape or a concave shape instead of a V shape. Further, the first positioning recessed portion and the second positioning recessed portion may penetrate the holder 35 in the thickness direction.

In the above-mentioned embodiment, the tips of the first to third positioning protruding portions 32a to 32c are formed to have a spherical and cylindrical shape but are not limited thereto and may be formed to have, for example, a normal cylindrical or hemispherical shape.

In the above-mentioned embodiment, the first to fifth bonding surface portions 37a to 37e are provided in the holder 35. However, the number of bonding surface portions and an arrangement form thereof are not limited thereto and are appropriately changeable. Further, the first to fifth bonding surface portions 37a to 37e may be omitted.

In the above-mentioned embodiment, for example, a solid adhesive containing a heat reversible resin component is employed as an adhesive. However, a double-sided adhesive tape may be employed as the adhesive.

In the above-mentioned embodiment, the concave mirror 31 is employed as a mirror but may be a convex mirror, a plane mirror, or the like as long as it is a mirror.

In the above-mentioned embodiment, the display device according to the invention is applied to an in-vehicle head-up display device but is not limited to the in-vehicle head-up display device and may be applied to a head-up display device to be mounted on transport such as an airplane and a ship. Further, the projection member is not limited to a windshield and may be a dedicated combiner. Further, the display device according to the invention may be applied to a display device such as a projector used inside or outside, instead of ahead-up display device. Further, the projection member is not limited to a light-transmissive projection member and may be a reflective screen. Further, for example, the display device according to the invention may be mounted on an eyeglass-type wearable terminal.

Furthermore, in the above-mentioned embodiment, the mirror unit 30 is applied to the display device 100 but may be applied to other optical products.

INDUSTRIAL APPLICABILITY

The invention is suitable for a head-up display device to be mounted on a vehicle.

REFERENCE SIGNS LIST

1 . . . viewer
10 . . . display unit
11 . . . light source
12 . . . liquid crystal display panel
13 . . . light-source substrate
14 . . . diffusion case
15 . . . heat sink
20 . . . reflecting mirror member
30 . . . mirror unit
31 . . . concave mirror
31a . . . mirror surface
31b . . . first end portion
31c . . . second end portion
32a to 32c . . . first to third positioning protruding portions
35 . . . holder
35a . . . first end portion
35b . . . second end portion
36a to 36c . . . first to third positioning recessed portions
36c1 . . . bottom surface
36c2 . . . side surface
37a to 37e . . . first to fifth bonding surface portions
38 . . . holding portion
55 . . . adhesive
60 . . . housing
100 . . . display device

The invention claimed is:

1. A mirror unit, comprising:
a concave mirror having a mirror surface for reflecting light and a back surface opposite the mirror surface, the back surface comprising 1) a first mirror-side positioning portion, 2) a second mirror-side positioning portion, and 3) a third mirror-side positioning portion; and
a holder that holds the concave mirror, the holder having a curved shape that matches a curve of the concave mirror, the holder comprising:
a first end;
a second end opposite the first end;
a first side extending between the first end and the second end;
a second side opposite the first side and extending between the first end and the second end;
a first rotary shaft disposed at the first end of the holder;
a second rotary shaft disposed at the second end of the holder, wherein a rotary axis extending between the first rotary shaft and the second rotary shaft is parallel to the first side and the second side of the holder;
a first holder-side positioning portion disposed at a position where the rotary axis meets the first end of the holder, wherein the first holder-side positioning portion of the holder receives the first mirror-side positioning portion of the concave mirror;
a second holder-side positioning portion disposed at a first corner formed from the second end and the first side of the holder, wherein the second holder-side positioning portion of the holder receives the second mirror-side positioning portion of the concave mirror; and
a third holder-side positioning portion disposed at a second corner formed from the second end and the second side of the holder, wherein the third holder-side positioning portion of the holder receives the third mirror-side positioning portion of the concave mirror.

2. The mirror unit according to claim 1, wherein:
the holder comprises a first surface on which the first holder-side positioning portion, the second holder-side positioning portion, and the third holder-side positioning portion are disposed;
the first holder-side positioning portion secures the concave mirror to the holder to prevent the first mirror-side positioning portion of the concave mirror from moving in a first direction that is parallel to both the first surface and the rotary axis of the holder, a second direction that is parallel to the first surface and perpendicular to the rotary axis, and a third direction that is perpendicular to the first surface and perpendicular to the rotary axis when the holder holds the concave mirror;

the second holder-side positioning portion secures the concave mirror to the holder to prevent the second mirror-side positioning portion of the concave mirror from moving in the second direction and the third direction while allowing the second mirror-side positioning portion to move in the first direction when the holder holds the concave mirror; and the third holder-side positioning portion secures the mirror to the holder to prevent the third mirror-side positioning portion of the concave mirror from moving in the third direction while allowing the third mirror-side positioning portion to move in the first direction and the second direction when the holder holds the concave mirror.

3. The mirror unit according to claim 2, wherein:

the first mirror-side positioning portion, the second mirror-side positioning portion, and the third mirror-side positioning portion each protrudes from the back surface of the concave mirror, the first holder-side positioning portion has a first concave shape that matches a shape of a protrusion of the first mirror-side positioning portion to prevent the first mirror-side positioning portion of the concave mirror from moving in the first direction, the second direction, and the third direction when the first holder-side positioning portion receives the first mirror-side positioning portion;

the second holder-side positioning portion has a second concave shape, wherein a longitudinal axis of an opening of the second concave shape is parallel to a virtual line connecting the first holder-side positioning portion and the second holder-side positioning portion to prevent the second mirror-side positioning portion of the concave mirror from moving in the second direction and the third direction while allowing the second mirror-side positioning portion to move in the first direction when the second holder-side positioning portion receives the second mirror-side positioning portion; and the third holder-side positioning portion has a third concave shape, the third concave shape comprises an abutting surface on which a tip of the third mirror-side positioning portion abuts to prevent the third mirror-side positioning portion of the concave mirror from moving in the third direction while allowing the third mirror-side positioning portion to move in the first direction and the second direction when the third holder-side positioning portion receives the third mirror-side positioning portion, the abutting surface being parallel with the first direction and the second direction.

4. The mirror unit according to claim 3, wherein:

the holder comprises bonding portions that secures the concave mirror to the holder, an adhesive is disposed between a respective bonding portion and the back surface of the concave mirror, a first bonding portion of the bonding portions is disposed in the first corner formed from the second end and the first side of the holder, a second bonding portion of the bonding portions is disposed in the second corner formed from the second end and the second side of the holder, a third bonding portion of the bonding portions is disposed in a third corner formed from the first end the first side of the holder, a fourth bonding portion of the bonding portions is disposed in a fourth corner formed from the first end and the first side of the holder, a first hypothetical line extending between the first bonding portion and the second bonding portion, a second hypothetical line extending between the second bonding portion and the third bonding portion, a third hypothetical line extending between the third bonding portion and the fourth bonding portion, and a fourth hypothetical line extending between the fourth bonding portion and the first bonding portion form a quadrilateral, the first holder-side positioning portion, the second holder-side positioning portion, the third holder-side positioning portion are disposed outside the formed quadrilateral.

5. The mirror unit according to claim 1, wherein:

the holder comprises bonding portions that secures the concave mirror to the holder, an adhesive is disposed between a respective bonding portion and the back surface of the concave mirror, a first bonding portion of the bonding portions is disposed in the first corner formed from the second end and the first side of the holder, a second bonding portion of the bonding portions is disposed in the second corner formed from the second end and the second side of the holder, a third bonding portion of the bonding portions is disposed in a third corner formed from the first end the first side of the holder, a fourth bonding portion of the bonding portions is disposed in a fourth corner formed from the first end and the first side of the holder, a first hypothetical line extending between the first bonding portion and the second bonding portion, a second hypothetical line extending between the second bonding portion and the third bonding portion, a third hypothetical line extending between the third bonding portion and the fourth bonding portion, and a fourth hypothetical line extending between the fourth bonding portion and the first bonding portion form a quadrilateral, the first holder-side positioning portion, the second holder-side positioning portion, the third holder-side positioning portion are disposed outside the formed quadrilateral.

6. A display device, comprising:

a display unit for emitting display light showing an image; and a mirror unit according to claim 5 for causing a projection member to reflect the display light from the display unit.

7. A display device, comprising:

a display unit for emitting display light showing an image; and a mirror unit according to claim 1 for causing a projection member to reflect the display light from the display unit.

8. The mirror unit according to claim 2, wherein:

the holder comprises bonding portions that secures the concave mirror to the holder, an adhesive is disposed between a respective bonding portion and the back surface of the concave mirror, a first bonding portion of the bonding portions is disposed in the first corner formed from the second end and the first side of the holder, a second bonding portion of the bonding portions is disposed in the second corner formed from the second end and the second side of the holder, a third bonding portion of the bonding portions is disposed in a third corner formed from the first end the first side of the holder, a fourth bonding portion of the bonding portions is disposed in a fourth corner formed from the first end and the first side of the holder, a first hypothetical line extending between the first bonding portion and the second bonding portion, a second hypothetical line extending between the second bonding portion and the third bonding portion, a third hypothetical line extending between the third bonding portion and the fourth bonding portion, and a fourth hypothetical line extending between the fourth bonding portion and the first bonding portion form a quadrilateral, the first holder-side positioning portion, the second holder-side positioning portion, the third holder-side positioning portion are disposed outside the formed quadrilateral.

9. A display device, comprising:

a display unit for emitting display light showing an image; and a mirror unit according to claim 2 for causing a projection member to reflect the display light from the display unit.

10. A display device, comprising:

a display unit for emitting display light showing an image; and a mirror unit according to claim 3 for causing a projection member to reflect the display light from the display unit.

* * * * *